Patented June 22, 1948

2,443,678

UNITED STATES PATENT OFFICE 2,443,678

CHLORINATED RUBBER CEMENTS

Benjamin S. Garvey, Akron, Ohio, assignor to The B. F. Goodrich Company, New York, N. Y., a corporation of New York No Drawing. Application June 30, 1944, Serial No. 543,053

1 Claim. (Cl. 260—3.5)

This invention relates to improved cements comprising mixtures of chlorinated rubber and one or more of the butadiene copolymers, particularly copolymers of butadiene and an acrylic nitrile such as butadiene-acrylonitrile copolymer, in a solvent.

I have discovered that chlorinated rubber and a butadiene copolymer may be mixed with, and dissolved in, a suitable solvent to produce a cement that is vastly superior in all its important properties to any similar cement that has been heretofore proposed. The cement of this invention possesses increased tackiness and it will not gel on standing. Usually, although not necessarily, the cement may contain in addition to the chlorinated rubber and butadiene copolymer any of the usual and common conditioning agents, antioxidants, vulcanization ingredients, and the like that are commonly used in such cements. By the method of this invention it is possible to make a cement that vulcanizes at ordinary room temperature by the proper choice of vulcanization ingredients. This "air-curing" cement will stand for an indefinite time when stored in bulk but vulcanizes in a very short time when spread in a thin layer and no additional heat other than the heat of room temperature need be applied. All these important properties as well as many others make the cements of this invention preferred for all purposes for which cements of this type are ordinarily used including use for adhesion, use as protective coatings, and the like.

The cements of this invention have proven themselves vastly superior to all prior cements of rubber, chlorinated rubber, or synthetic elastics for those purposes in which such cements are usually employed. For example, these improved cements serve admirably for adhering synthetic elastics such as butadiene polymers, copolymers of butadiene with styrene, acrylonitrile, or the like, plasticized polyvinyl chloride, and polyisobutylene, as well as natural rubber to wood, metal, porcelain, paper, leather, glass, or practically any surface to which a firm and strong bond is desired. These cements may also be used to adhere rubber to rubber, rubber to synthetic elastics, synthetic elastics to synthetic elastics, leather to leather, leather to wood, to metal, or to other materials, paper to paper, metal to porcelain, wood to metal and so on ad infinitum. The adhesion that is so obtained is found to be of great strength over an extremely long life. In general it may be said that these cements may be used to adhere any two like or unlike stable solid materials together to provide a strong, long-lasting bond. A firm bond may even be formed with cloth, and like materials, but the chlorine in the chlorinated rubber may attack the cloth and destroy it. In addition to their use to obtain superior adhesion, these cements may also be used to apply as protective coatings to surfaces as the cements form a coating quite resistant to oil, water, grease, acids, alkalies, and the like.

The cements are usually and most conveniently prepared by first milling into the solid butadiene copolymer such conditioning agents, antioxidants, vulcanization accelerators, vulcanization materials, and the like as may be desired to produce a cement with any given properties all in accordance with usual practice. The vulcanization materials are, of course, for vulcanizing or "curing" the particular butadiene copolymer used. After these compounding ingredients are milled into the butadiene copolymer this copolymer is dissolved in a suitable solvent and the solution is mixed with a solution of chlorinated rubber dissolved in a solvent to make up the finished cement.

The chlorinated rubber of this invention preferably should be the usual commercial product of 100 to 150 centipoise viscosity that has been saturated with chlorine and which contains 60% to 65% chlorine, although valuable results are obtainable with rubbers chlorinated to widely varying degrees. The butadiene copolymer used is prepared by copolymerizing about one part of a butadiene-1,3 hydrocarbon or a homolog, with about $\frac{1}{10}$ to 2 parts of an unsaturated monomer copolymerizable with the butadiene, preferably an acrylic nitrile such as acrylonitrile. Best results are obtained when the copolymer is one prepared by the copolymerization of from about 85 parts of the butadiene-1,3 and about 15 parts of the monomer to about 45 parts butadiene-1,3 and about 55 parts of the monomer, especially when the monomer is an acrylic nitrile such as acrylo nitrile, and these proportions accordingly constitute a preferred range. Among the unsaturated monomers copolymerizable with a butadiene-1,3 hydrocarbon to form a butadiene copolymer are the aryl olefins such as styrene and vinyl naphthalene; the alpha methylene carboxylic acids and their esters, nitriles and amides such as acrylic acid, methyl acrylate, methyl methacrylate; acrylic nitriles such as acrylonitrile, methacrylonitrile; methacrylamide, and the like; isobutylene, methyl vinyl ether; methyl vinyl ketones; vinylidene chloride; and other unsaturated hydrocarbons, esters, alcohols, acids, ethers, and the like which contain the polymerizable structure $CH_2=C=$ where at least one of he disconnected valencies is attached to an electro-active group, i. e., a group which substantially increases the electrical dissymmetry or polar character of the molecule. The copolymerization may be accomplished by any of the methods well known in the polymerization art and including homogenous copolymerization, copolymerization in an aqueous medium, and the like. These copolymers generally have the physical characteristics of unvulcanized natural rubber in that they are somewhat plastic and flexible and are capable of being milled.

The term "a butadiene-1,3 hydrocarbon" used herein includes not only the common butadiene-1,3 but also its homologs, including isoprene, 2,3-dimethyl butadiene-1,3, piperylene, and the like.

The cements herein disclosed are most conveniently made up by dissolving the chlorinated rubber in a suitable solvent, dissolving the compounded butadiene copolymer in a solvent, and then mixing the two solutions to make the final cement. The butadiene copolymer may contain conditioning agents such as plasticizers, antioxidants, and the like, and vulcanizing ingredients such as sulfur, vulcanization accelerators, and the like, the use of all such compounding materials being well understood in the art. Solvents which may be used include such volatile organic solvents as benzene, toluene, chlorobenzene, chlorotoluene, methyl ethyl ketone, acetone, butyl acetate, ethyl acetate, ethylene dichloride, or mixtures of these or similar solvents.

A typical cement made according to this invention is shown in the following recipe:

|  | Parts by Weight | |
| --- | --- | --- |
|  | A | B |
| A butadiene copolymer such as one prepared by the copolymerization of 55 parts butadiene and 45 parts acrylonitrile | 100 | 100 |
| Channel black | 50 | 50 |
| Zinc oxide | 5 | 5 |
| Poly 2,2,4-trimethyl 1,2-dihydroquinoline | 5 | 5 |
| Crude lauric acid | 1.5 | 1.5 |
| Soft coal tar | 10 | 10 |
| Sulfur | 3 | 0 |
| "Butyl-8" (a dithiocarbamate accelerator) | 0 | 8 |
|  | 174.5 | 179.5 |

560 grams of A are dissolved in ethylene dichloride and 560 grams of B are dissolved in ethylene dichloride. Each is made up to 4.0 liters with more ethylene dichloride. The finished cement is then made up by mixing equal volumes of the above with two volumes of a solution consisting of 20 parts by weight of chlorinated rubber (100–150 centipoise viscosity or containing approximately 65% chlorine), 200 parts of benzene and 2 parts of tetralin. The butadiene copolymer solution is prepared in two parts, A and B, because as soon as the copolymer is mixed with sulfur and "Butyl-8" accelerator vulcanization begins even at room temperature. To prevent this the sulfur and accelerator are kept separate until it is time to mix the chlorinated rubber solution with the copolymer solution. Surprisingly enough it has been found that although the above chlorinated rubber-butadiene copolymer cement vulcanizes at ordinary room temperature when it is spread in a thin layer it does not vulcanize when it is kept stored in bulk and may be kept indefinitely this way without any apparent change. These precautions are, of course, not necessary when other accelerators that do not promote "air-curing" are used in place of the "Butyl-8."

Due to the ingredients used in this particular cement it may be vulcanized at ordinary room temperature. This cement may be kept indefinitely in a container in bulk but immediately upon spreading in a thin layer vulcanization begins and is complete in six to ten hours. Other cements may be made by following the general formula as given and the butadiene copolymer may be any of those listed hereinabove, or similar butadiene copolymers. The chlorinated rubber and butadiene copolymers are miscible in all proportions. Other age-resistors may be substituted for the poly 2,2,4-trimethyl 1,2-dihydro quinoline, other softeners may be used, and other accelerators may also be used instead of the "Butyl-8." The proportions of the ingredients may also be varied and different solvents from those specified may be employed. By the proper choice of the accelerator and the amounts of sulfur used various rates of vulcanization of the butadiene copolymers may be obtained. As can be seen the recipe given here as an example may be varied widely to produce any property desired in the finished cement and all compounding ingredients and solvents will be generally equivalent to those specifically mentioned.

This application is a continuation-in-part of my co-pending application Serial No. 428,114, filed January 24, 1942, now abandoned.

Having described my invention together with specific examples and lists of equivalent materials so as to make the invention clearly understandable to those skilled in the art, it is my desire to protect the invention broadly within the spirit and scope of the appended claim.

I claim:

A cement comprising a solvent, chlorinated rubber, and a copolymer prepared by the copolymerization of about 55 parts by weight of butadiene-1,3 and about 45 parts by weight of acrylonitrile.

BENJAMIN S. GARVEY.

REFERENCES CITED

The following references are of record in the file of this patent:

UNITED STATES PATENTS

| Number | Name | Date |
| --- | --- | --- |
| 2,110,539 | Weiss | Mar. 8, 1938 |
| 2,143,470 | Becker et al. | Jan. 10, 1939 |
| 2,170,947 | Habgood et al. | Aug. 29, 1939 |

OTHER REFERENCES

"Rubber Age," pp. 315–318, Feb. 1941.